United States Patent
Hennessey

(10) Patent No.: US 7,343,354 B2
(45) Date of Patent: Mar. 11, 2008

(54) METHOD FOR DETERMINING DEMAND AND PRICING OF ADVERTISING TIME IN THE MEDIA INDUSTRY

(75) Inventor: Peter J. Hennessey, Canton, MA (US)

(73) Assignee: Wideorbit, Inc., San Francisco, CA (US)

( * ) Notice: Subject to any disclaimer, the term of this patent is extended or adjusted under 35 U.S.C. 154(b) by 1000 days.

(21) Appl. No.: 10/217,383

(22) Filed: Aug. 12, 2002

(65) Prior Publication Data

US 2003/0050827 A1  Mar. 13, 2003

(51) Int. Cl.
G06Q 30/00 (2006.01)
G06Q 20/00 (2006.01)
G06Q 40/00 (2006.01)
G06F 7/00 (2006.01)
H04N 7/10 (2006.01)

(52) U.S. Cl. .................... 705/400; 705/14; 705/16; 705/37; 707/104.1; 725/32; 725/37

(58) Field of Classification Search ............ None
See application file for complete search history.

(56) References Cited

U.S. PATENT DOCUMENTS 6,286,140 B1 * 9/2001 Ivanyi ................ 725/14
6,338,043 B1 * 1/2002 Miller ................ 705/14
6,920,464 B2 * 7/2005 Fox ................ 707/104.1
6,937,996 B1 * 8/2005 Forsythe et al. ............ 705/16
6,985,882 B1 * 1/2006 Del Sesto ................ 705/37
7,124,091 B1 * 10/2006 Khoo et al. ................ 705/14
2002/0083444 A1 * 6/2002 Blasko et al. ................ 725/35
2003/0070167 A1 * 4/2003 Holtz et al. ................ 725/32

* cited by examiner

*Primary Examiner*—John W. Hayes
*Assistant Examiner*—Fadey S. Jabr
(74) *Attorney, Agent, or Firm*—Robert O. Guillot; Intellectual Property Law Offices

(57) ABSTRACT

The present invention utilizes customer/user generated data and market available data to provide a framework and guidance for a seller to price advertising time and space for programs offered by a media outlet, and to project future demand for advertising time and space. The invention determines the number available advertising spots (avails) that exist in a market, the projected rating of the avail, the historical advertising avail sales price, and a reasonable target price for each avail. It utilizes avail request information from individual advertising agency clients, sellout data from broadcast media, together with ratings and projections from published rating services (such as Neilsen and CMR) to produce a series of reports that provide needed information to create projections of future inventory, demand and pricing ranges. The reports include avail demand and analysis reports, market blueprint reports, market CPP tolerance reports, pricing grids, and market share trend reports.

8 Claims, 13 Drawing Sheets

---

```
                    AVAIL REQUEST
                    Acme Agency
                    Joe the Buyer
                    415-555-2222

A.    To:     Lara, WXXX/ Amanda WXYZ /Cindy KXXX
              Mark KXYZ/Jane ABCD/Glenn DCBA B.    CLIENT          AutoParts.com
      PRODUCT    Mufflers
      EST        58
      FLIGHT 1/10-3/5
      DAYPARTS   am, late news, late fringe
      CPP        $120/$450/$265
      DEMO:  wm2554
      BUDGET:    $104,000
      SPECIFICS: Low cpps. Please submit your best rates. I'll look at the other buys I have on for
                 1q00. Rates should be in line.

DUE        Tomorrow, Friday 12/3
```

AVAIL REQUEST
Acme Agency
Joe the Buyer
415-555-2222

A. To: Lara, WXXX/ Amanda WXYZ /Cindy KXXX
   Mark KXYZ/Jane ABCD/Glenn DCBA

B. CLIENT     AutoParts.com
   PRODUCT    Mufflers
   EST        58
   FLIGHT 1/10-3/5
   DAYPARTS   am, late news, late fringe
   CPP        $120/$450/$265
   DEMO: wm2554
   BUDGET:    $104,000
   SPECIFICS: Low cpps. Please submit your best rates. I'll look at the other buys I have on for 1q00. Rates should be in line.

DUE        Tomorrow, Friday 12/3

| Station | Program | Time Period | Weekdays | Daily Avails | # of Days | Quarterly Avails | Demo P/ A18-49 | Quarterly Points | Est Sellout | Est CPP | Est Rate | Est Revenue | Percent Revenue |
|---|---|---|---|---|---|---|---|---|---|---|---|---|---|
| AM - Early Morning | | | | | | | | | | | | | |
| WXXX | NEWS | | M-F | 52.1 | 70 | 3647 | 3.2 | 11670.4 | 85% | $280 | $896 | $2,777,555 | 10.7% |
| WXXX | TODAY SHOW | | M-F | 26.4 | 70 | 1848 | 4.1 | 7576.8 | 85% | $450 | $1,845 | $2,898,126 | 11.2% |
| WXXX | EARLY SHOW | | M-F | 23.8 | 70 | 1666 | 2 | 3332 | 85% | $150 | $300 | $424,830 | 1.6% |
| | | | | 7161 | 3.1 | 22579.2 | | $293 | $1,014 | $6,100,511 | 23.5% | | |
| DY - Daytime | | | | | | | | | | | | | |
| WXXX | ACCESS HOLLYW | | M-F | 10.4 | 70 | 728 | 1.5 | 1092 | 85% | $200 | $300 | $185,640 | 0.7% |
| WXXX | DAYS OF OUR LIVES | | M-F | 1.4 | 70 | 98 | 1.2 | 117.6 | 85% | $170 | $204 | $16,993 | 0.1% |
| WXXX | LIVE WITH REGIS | | M-F | 22.1 | 70 | 1547 | 1.6 | 2475.2 | 85% | $190 | $304 | $399,745 | 1.5% |
| WXXX | MONTEL WILLIAMS | | M-F | 23.7 | 70 | 1659 | 1 | 1659 | 85% | $90 | $90 | $112,812 | 0.4% |
| WXXX | NEWS | | M-F | 28.8 | 70 | 2016 | 3 | 6048 | 85% | $360 | $1,080 | $1,850,688 | 7.1% |
| WXXX | PASSIONS | | M-F | 5.6 | 70 | 392 | 1.5 | 588 | 85% | $200 | $300 | $99,960 | 0.4% |
| WXXX | PEOPLES COURT | | M-F | 14.7 | 70 | 1029 | 1.7 | 1749.3 | 85% | $190 | $323 | $282,512 | 1.1% |
| WXXX | TODAY SHOW | | M-F | 10.9 | 70 | 763 | 1.6 | 1220.8 | 85% | $175 | $280 | $181,594 | 0.7% |
| | | | | 8232 | 1.8 | 14949.9 | | $196 | $359 | $3,129,944 | 12.1% | | |
| EF - Early Fringe | | | | | | | | | | | | | |
| WXXX | DAYS OF OUR LIVES | | M-F | 2.8 | 70 | 196 | 3.1 | 607.6 | 85% | $450 | $1,395 | $232,407 | 0.9% |
| WXXX | NBC NIGHTLY NEWS | | M-F | 0.2 | 70 | 14 | 5.2 | 72.8 | 85% | $800 | $4,160 | $49,504 | 0.2% |
| WXXX | NEWS | | M-F | 21.5 | 70 | 1505 | 4.6 | 6923 | 85% | $600 | $2,760 | $3,530,730 | 13.6% |
| | | | | 1715 | 4.3 | 7603.4 | | $617 | $2,772 | $3,812,641 | 14.7% | | |
| EN - Early News | | | | | | | | | | | | | |
| WXXX | NEWS | | M-SUN | 25.1 | 98 | 2459.8 | 4.8 | 11807.04 | 85% | $650 | $3,120 | $6,523,390 | 25.2% |
| | | | | 2459.8 | 4.8 | 11807 | | $650 | $3,120 | $6,523,390 | 25.2% | | |
| AC - Prime Access | | | | | | | | | | | | | |
| WXXX | EXTRA ENTERTAIN | | M-F | 12.1 | 70 | 847 | 2.6 | 2202.2 | 85% | $320 | $832 | $598,998 | 2.3% |
| WXXX | REAL TV | | M-F | 11.8 | 70 | 826 | 6.5 | 5369 | 85% | $800 | $5,200 | $3,650,920 | 14.1% |
| | | | | 1673 | 4.5 | 7571.2 | | $560 | $3,016 | $4,249,918 | 16.4% | | |
| LN - Late News | | | | | | | | | | | | | |
| WXXX | NEWS | | M-SUN | 12.9 | 98 | 1264.2 | 4.3 | 5436.06 | 85% | $400 | $1,720 | $1,848,260 | 7.1% |
| | | | | 1264.2 | 4.3 | 5436.1 | | $400 | $1,720 | $1,848,260 | 7.1% | | |
| ON - Overnight | | | | | | | | | | | | | |
| WXXX | LATE NGT./CONAN | | M-F | 1.1 | 70 | 770 | 1.2 | 924 | 85% | $100 | $120 | $78,540 | 0.3% |
| WXXX | TONIGHT SHOW | | M-F | 11.6 | 70 | 812 | 1.4 | 1136.8 | 85% | $180 | $252 | $173,930 | 0.7% |
| | | | | 1582 | 1.3 | 2060.8 | | $140 | $186 | $252,470 | 1% | | |
| | | | | 24087 | 2.8 | 72007.6 | | $387 | $1,274 | $25,917,134 | 100% | | |

| Rate | CPP | 100% | 90% | 80% | 70% | 60% | 50% | 40% | 30% | 20% | 10% |
|---|---|---|---|---|---|---|---|---|---|---|---|
| $430 | $430 | $215,000 | $193,500 | $172,000 | $150,500 | $129,000 | $107,500 | $86,000 | $64,500 | $43,000 | $21,500 |
| $420 | $420 | $210,000 | $189,000 | $168,000 | $147,000 | $126,000 | $105,000 | $84,000 | $63,000 | $42,000 | $21,000 |
| $410 | $410 | $205,000 | $184,500 | $164,000 | $143,500 | $123,000 | $102,500 | $82,000 | $61,500 | $41,000 | $20,500 |
| $400 | $400 | $200,000 | $180,000 | $160,000 | $140,000 | $120,000 | $100,000 | $80,000 | $60,000 | $40,000 | $20,000 |
| $390 | $390 | $195,000 | $175,500 | $156,000 | $136,500 | $117,000 | $97,500 | $78,000 | $58,500 | $39,000 | $19,500 |
| $380 | $380 | $190,000 | $171,000 | $152,000 | $133,000 | $114,000 | $95,000 | $76,000 | $57,000 | $38,000 | $19,000 |
| $370 | $370 | $185,000 | $166,500 | $148,000 | $129,500 | $111,000 | $92,500 | $74,000 | $55,500 | $37,000 | $18,500 |
| $360 | $360 | $180,000 | $162,000 | $144,000 | $126,000 | $108,000 | $90,000 | $72,000 | $54,000 | $36,000 | $18,000 |
| $350 | $350 | $175,000 | $157,500 | $140,000 | $122,500 | $105,000 | $87,500 | $70,000 | $52,500 | $35,000 | $17,500 |
| $340 | $340 | $170,000 | $153,000 | $136,000 | $119,000 | $102,000 | $85,000 | $68,000 | $51,000 | $34,000 | $17,000 |
| $330 | $330 | $165,000 | $148,500 | $132,000 | $115,500 | $99,000 | $82,500 | $66,000 | $49,500 | $33,000 | $16,500 |
| $320 | $320 | $160,000 | $144,000 | $128,000 | $112,000 | $96,000 | $80,000 | $64,000 | $48,000 | $32,000 | $16,000 |
| $310 | $310 | $155,000 | $139,500 | $124,000 | $108,500 | $93,000 | $77,500 | $62,000 | $46,500 | $31,000 | $15,500 |
| $300 | $300 | $150,000 | $135,000 | $120,000 | $105,000 | $90,000 | $75,000 | $60,000 | $45,000 | $30,000 | $15,000 |
| $290 | $290 | $145,000 | $130,500 | $116,000 | $101,500 | $87,000 | $72,500 | $58,000 | $43,500 | $29,000 | $14,500 |
| $280 | $280 | $140,000 | $126,000 | $112,000 | $98,000 | $84,000 | $70,000 | $56,000 | $42,000 | $28,000 | $14,000 |
| $270 | $270 | $135,000 | $121,500 | $108,000 | $94,500 | $81,000 | $67,500 | $54,000 | $40,500 | $27,000 | $13,500 |
| $260 | $260 | $130,000 | $117,000 | $104,000 | $91,000 | $78,000 | $65,000 | $52,000 | $39,000 | $26,000 | $13,000 |

METHOD FOR DETERMINING DEMAND AND PRICING OF ADVERTISING TIME IN THE MEDIA INDUSTRY

BACKGROUND OF THE INVENTION

1. Field of the Invention

The present invention relates generally to computerized systems for pricing advertising time, and more particularly to a computerized system for determining demand and pricing of advertising time in the television and radio media industry.

2. Description of the Prior Art

The pricing of advertising spots, termed "avails", on radio and television is based upon many factors including demand, the availability of limited avail inventory, and the differing ratings of various shows. However, all of these factors, as well as others, are constantly changing, making accurate and reliable pricing decisions a difficult task. Additionally, because advertising avails are purchased months in advance of actual broadcast, the pricing is primarily based upon projections of what the future demand and ratings for particular avails will be. Furthermore, legal restrictions against collusion prevent broadcasters from revealing their advertising rates to each other, such that price competition, and therefore pricing uncertainty, exists in the industry.

Of course, the broadcast and advertising industry have developed methods for determining pricing. However, much of these methods are fairly arbitrary and rely on individual recollection and usage of prior season rates, with a good deal of haggling between the advertising agency media buyers that place the ads and the broadcast media.

There is therefore a need for a systematic approach that utilizes the many variables along with validated presumptions to provide a more reliable method for projecting demand and providing a pricing range that is realistic and can generally assure that the broadcast medium will operate profitably. The present invention utilizes a computerized database and analysis system to provide such demand projections and pricing guidelines.

SUMMARY OF THE INVENTION

The present invention is a computerized system for determining demand and pricing of advertising time in the television and radio media industry. It utilizes avail request information from individual advertising agency clients, sell-out data from broadcast media, together with ratings and projections from published rating services (Neilsen) to produce a series of reports that provide needed information and create projections of future inventory, demand and pricing ranges. The reports include avail demand and analysis reports, market blueprint reports, market CPP tolerance reports, pricing grids, and market share trend reports.

It is an advantage of the advertising time demand and pricing system of the present invention that pricing ranges for future advertising avails are provided to a user.

It is another advantage of the advertising time demand and pricing system of the present invention that projections of advertising avail inventory are provided.

It is a further advantage of the advertising time demand and pricing system of the present invention that a broadcast station's future revenues can be reliably estimated.

It is yet another advantage of the advertising time demand and pricing system of the present invention that estimates of revenue from competing broadcast media can be obtained.

These and other features and advantages of the present invention will no doubt become apparent to those skilled in the art upon reading the following detailed description which makes reference to the several figures of the drawings.

IN THE DRAWINGS

FIG. 1 depicts an avail request information card;

FIG. 2 is a header portion of an avail request form;

FIG. 3 is a daypart mix portion of an avail request form;

Figure 4:
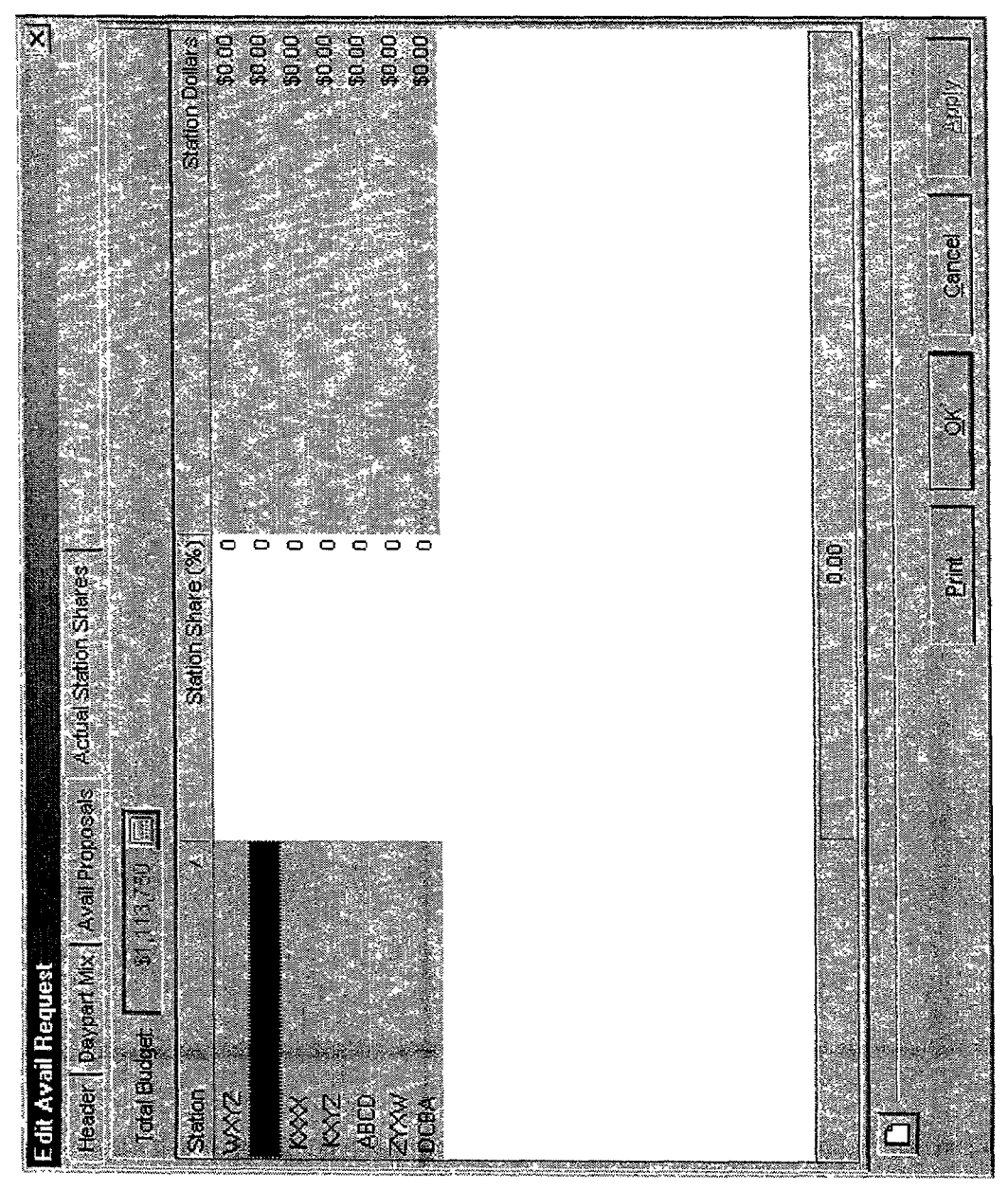

FIG. 4 is an actual station shares portion of an avail request form;

FIG. 5 is an avails by demand report;

FIG. 7 is an avails by dollars report;

FIG. 8 is a market revenue share report;

FIG. 10 is a market blueprint report;

FIG. 12 is a pricing grid report; and

DESCRIPTION OF THE PREFERRED EMBODIMENTS

Figure 2:
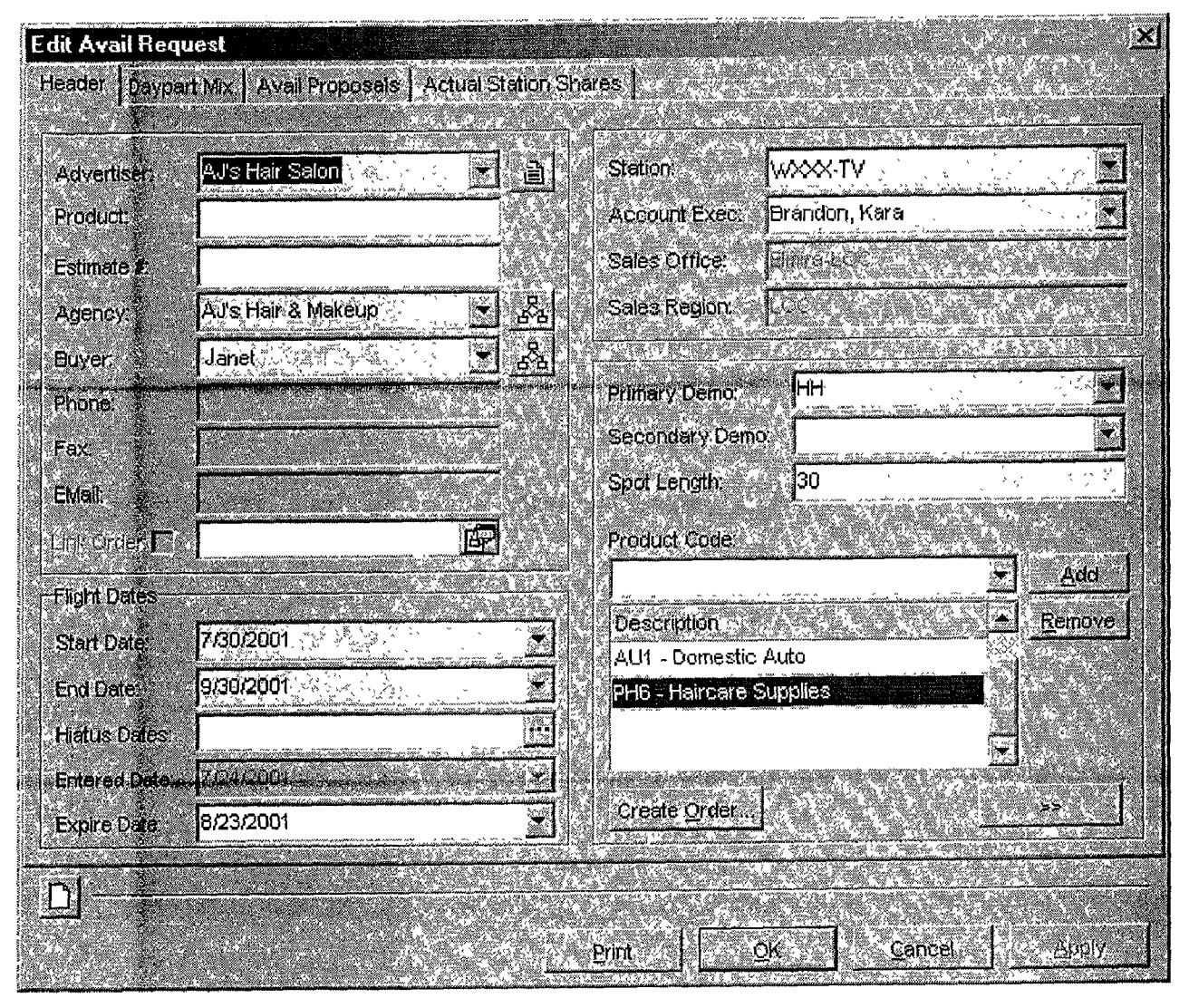
Figure 6:
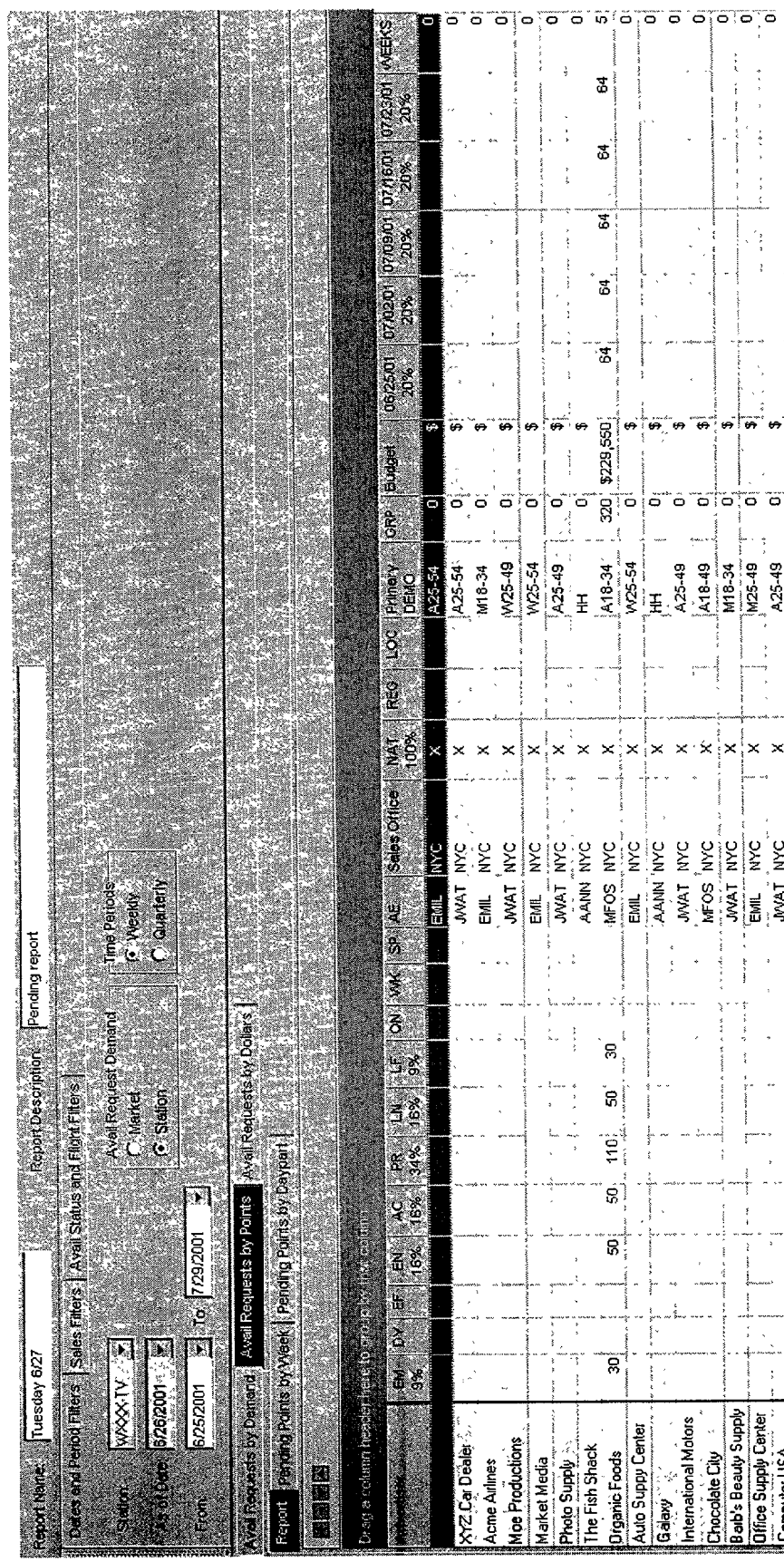
FIG. 6 is an avails by points report.

Initially, data in an Avail Request, as depicted in FIG. 1, is obtained from a buyer on behalf of an advertiser, and it is entered into the system database through an Avail Request Form (see FIG. 2). The Avail Request Form is broken into three areas: Header (see FIG. 2), Daypart Mix (see FIG. 3), and Actual Station Shares (see FIG. 4). As depicted in FIG. 2, header information provided by the buyer includes: Advertiser, Agency, buyer, flight dates, demographics, and spot length. The station assigns the account executive and product code(s).

Figure 3:
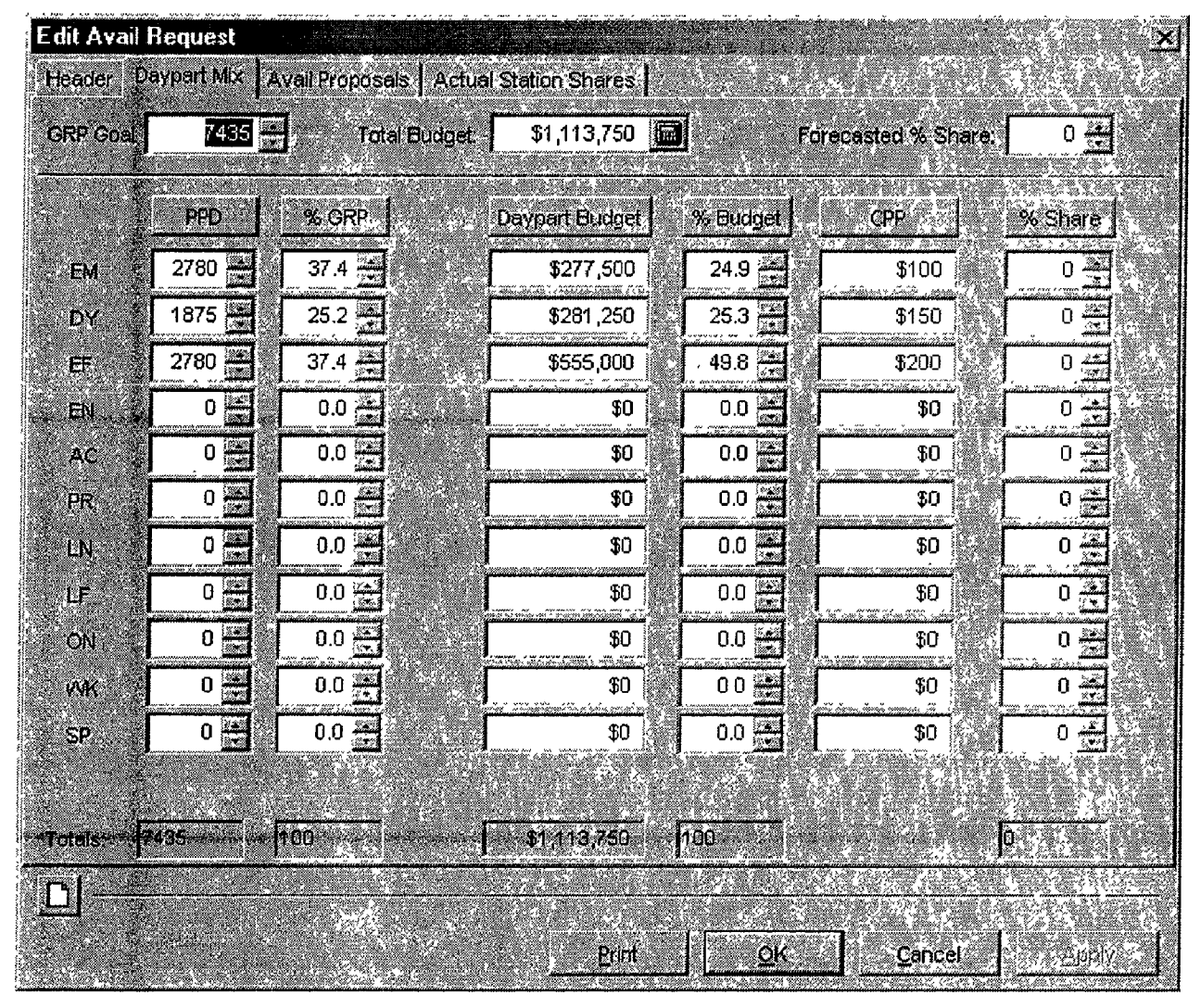

Information in the daypart mix area of FIG. 3 includes: gross rating point (GRP) goal broken into points per daypart (PPD) and percentage points per daypart; total budget dollars ($) broken into budget $ by daypart (Daypart Budget) and percentage of budget $ by daypart; and cost per rating point by daypart (Daypart CPP). The seller may also choose to input anticipated % share of the buy. These fields are defined as follows:

Gross Rating Point Goal (GRP)—This goal is received by one of the following methods: the buyer giving the information to the AE directly, or it is calculated summing the PPD column or it is calculated using the Daypart Budget and Daypart CPP information.

| | |
|---|---|
| Daypart Budget and Daypart CPP given, GRP calculated | PPD = Daypart Budget/Daypart CPP GRP = SUM of all PPD |
| Example: | $277,500/$100 = 2775 |
| | 7435 = 2780 + 1875 + 2780 |

Points Per Daypart (PPDs)—This information is received by one of the following methods: the buyer gives the AE the information directly, or it is calculated using GRP Goal and % GRP information, or it is calculated using the Daypart Budget and Daypart CPP information.

| | |
|---|---|
| GRP Goal and % GRP given, PPD calculated | PPD = GRP Goal * (% GRP/100) |
| Example: | 2780 = 7435 * (37.4/100) |
| Daypart Budget and Daypart CPP given, PPD calculated | PPD = Daypart Budget/Daypart CPP |
| Example: | 2780 = $277,500/$100 |

Percentage of Gross Rating Points (% GRP)—This column reports the percentage of the Total GRP that resides in each daypart. This information is received by one of the following methods: the buyer provides the % GRP directly, or it is calculated using GRP Goal and PPD, or it is calculated using the Daypart Budget and Daypart CPP information.

| | |
|---|---|
| GRP Goal and PPD given, % GRP calculated | % GRP = (PPD/GRP Goal) * 100 |
| Example: | 37.4 = (2780/7435) * 100 |
| Daypart Budget and Daypart CPP given, % GRP calculated | PPD = Daypart Budget/Daypart CPP<br>GRP Goal = Sum of all PPD<br>% GRP = (PPD/Total GRP Goal) * 100 |
| Example: | 2780 = $277,500/$100<br>7435 = 2780 + 1875 + 2780<br>37.4 = (2780/7435) * 100 |

Total Budget—This is the total budget for the market buy. This information is received by one of the following methods: the buyer provides the total budget directly, or it is calculated by summing the daypart budgets, or it is calculated by summing the daypart budgets that are calculated using the PPD and Daypart CPP.

| | |
|---|---|
| PPD and Daypart CPP given, Total Budget calculated | Daypart Budget = PPD * Daypart CPP<br>Total Budget = Sum of all Daypart Budgets |
| Example: | $277,500 = 2780 * $100<br>$1,113,750 =<br>$277,500 + $281,250 + $555,000 |

Daypart Budget—This column reports the buyer's budget for each daypart and calculates the "Total Budget" field at the top of the tab. This information is received by one of the following methods: the buyer provides this information directly as a total, by daypart and/or by daypart %, or it is calculated using PPD and Daypart CPP information.

| | |
|---|---|
| Total Budget and % Budget given, Daypart Budget calculated | Daypart Budget =<br>Total Budget * % Budget |
| Example: | $277,500 = $1,113,750 * (24.9/100) |
| PPD and Daypart CPP given, Daypart Budget calculated | Daypart Budget =<br>PPD * Daypart CPP |
| Example: | $277,500 = 2780 * $100 |

% Budget—This column reports the % of the budget per daypart. This information is received by one of the following methods: the buyer provides the information directly, or it is calculated by dividing the daypart budget by the total budget.

| | |
|---|---|
| Daypart Budget and Total Budget given, % Budget calculated | % Budget =<br>(Daypart Budget/Total Budget) * 100 |
| Example: | 24.9 = ($277,500/$1,113,750) * 100 |

Daypart Cost Per Point (Daypart CPP)—This is the cost of one rating point by daypart. This information is received by one of the following methods: the buyer provides this information directly, or it is calculated using PPD and daypart budget information.

| | |
|---|---|
| PPD and Daypart Budget given, Daypart CPP calculated | Daypart CPP = Daypart Budget/PPD |
| Example: | $100 = $277,500/2780 |

Forecasted Percentage of Share—This column calculates the Forecasted Percent Share the user expects per daypart and overall. This information is not calculated. The anticipated % share of the overall buy the account executive expects to receive for each daypart is input by the account executive. This number is generally estimated.

The third area of the Avail Request Form, the Actual Station Shares (see FIG. 4), is populated when the account executive inputs the numbers that reflect the actual overall % share of the buy, as well as the % share received by their competitors. The buyer provides this information. There are no calculations on this portion of the Avail Request Form screen.

A plurality of Pending Avails Reports (each compiled from many individual avail requests) display cumulative data by week and by daypart for a comprehensive view of pending business. When used in conjunction with the station's inventory, the Pending Avails Reports provide a clearer picture of future sellout, allowing for better pricing decisions and inventory management. The Pending Avails Reports can be presented in a variety of ways. In addition to pending avails, a user can view avails converted to orders and/or expired avails can be presented. A user can view avails by week or by quarter, for the market or a station, and a user may select an "as of" date to view a snapshot of avails at a given point in time. A pending avails report can be calculated by market and by station. If calculated by station, it determines the station's expected share by importing the % share from the avail request.

Figure 5:
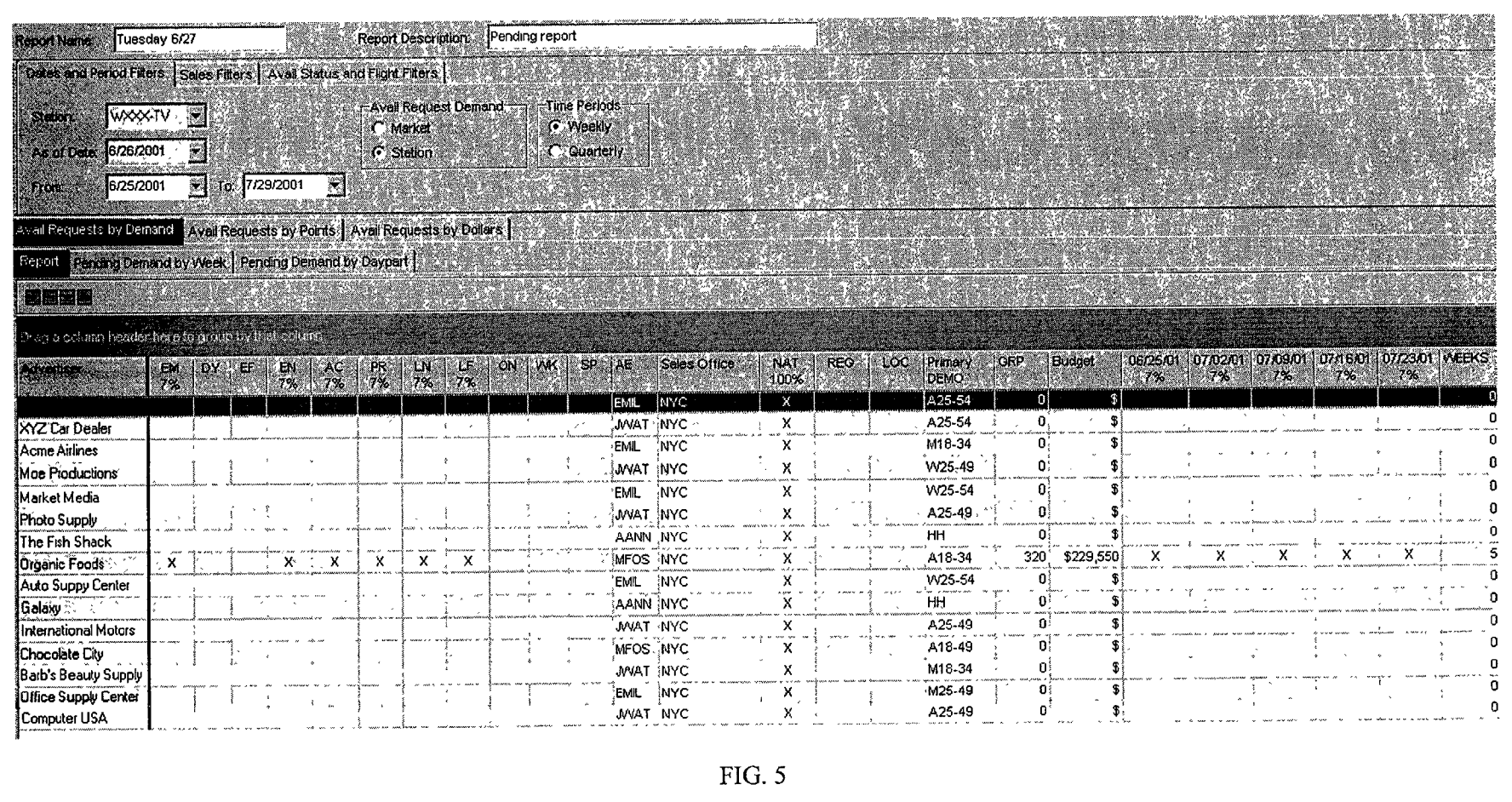
Figure 7:
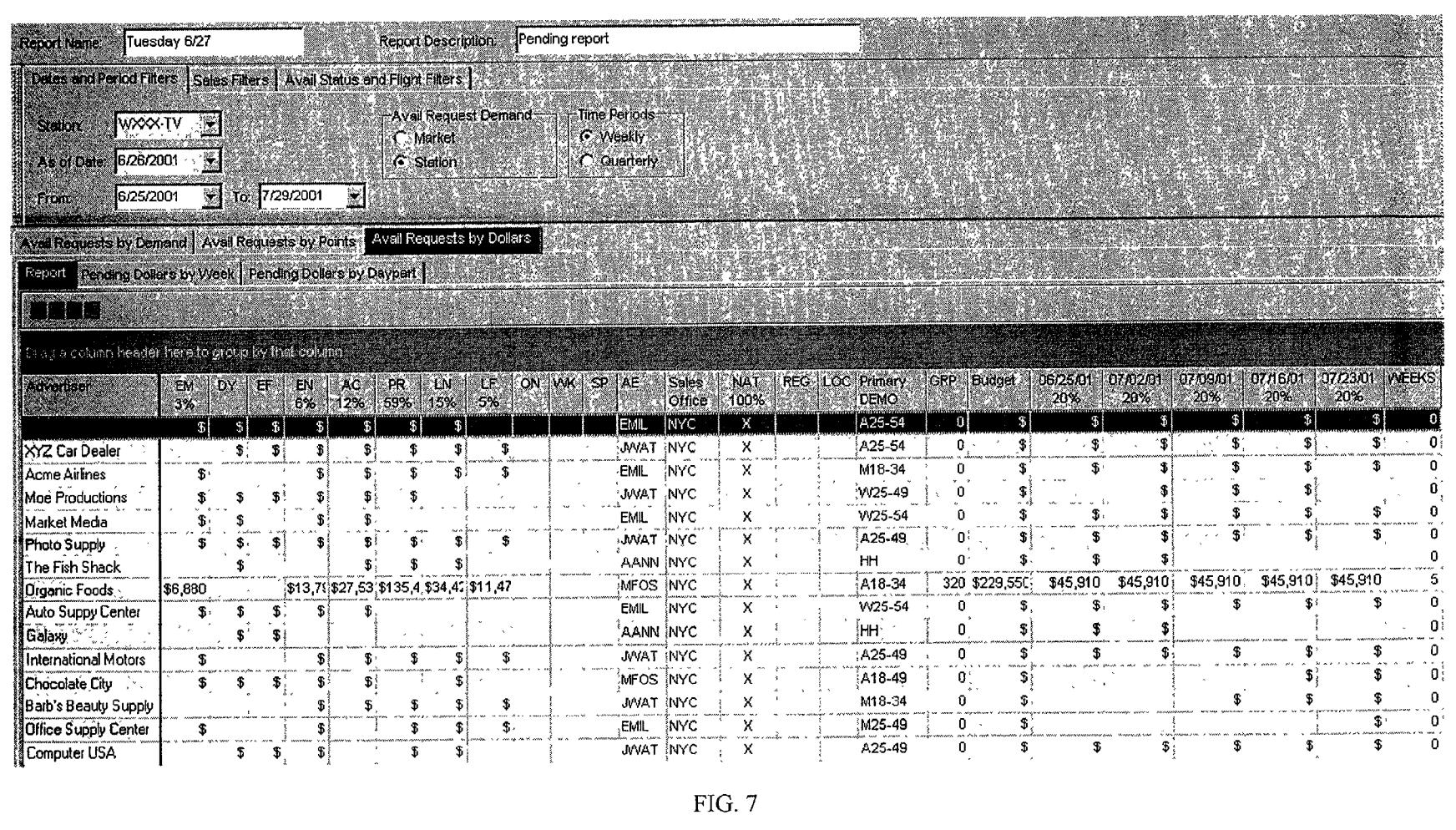

Three ways are presented to view the Pending Avails Reports, the Avail Requests by Demand (see FIG. 5), Avail Requests by Points (see FIG. 6), or Avail Requests by Dollars (see FIG. 7). Each report (FIGS. 5, 6 and 7) lists data in a grid view, along with a quick summary view in the Pending by Week and Pending by Daypart graphs. The reports of FIGS. 5, 6 and 7 display data as follows:

Advertiser—displays the advertiser for each avail request that falls within the selected criteria.

Dayparts—displays the percentage of pending business that falls in each daypart. All dayparts, as defined in Sales Codes, are listed across the grid.

Account Executive—displays the AE associated with each advertiser.

Sales Office—displays the sales office for each AE.

Sales Regions—displays whether the AE is national, regional, or local, and what percentage of all of the pending business belongs to each region.

Primary Demo—displays the primary demo for each advertiser's avail requests.

GRP—lists the gross ratings points for each advertiser's avail requests.

Budget—lists the total budget for each advertiser's avail requests

Dates—displays either individual weeks or individual quarters, depending on filters selected above.

Total Weeks/Quarters—displays the total number of weeks or quarters for each avail request within the date range you selected.

With regard to the Avails by Demand Report (FIG. 5), the daypart column indicates whether the advertiser has business pending in that daypart. With regard to the Avail by Points Report (FIG. 6) the daypart column displays how many points per daypart the advertiser has pending. With regard to the Avail by Dollars Report (FIG. 7), the daypart column displays how much money per daypart the advertiser has pending.

Figure 8:
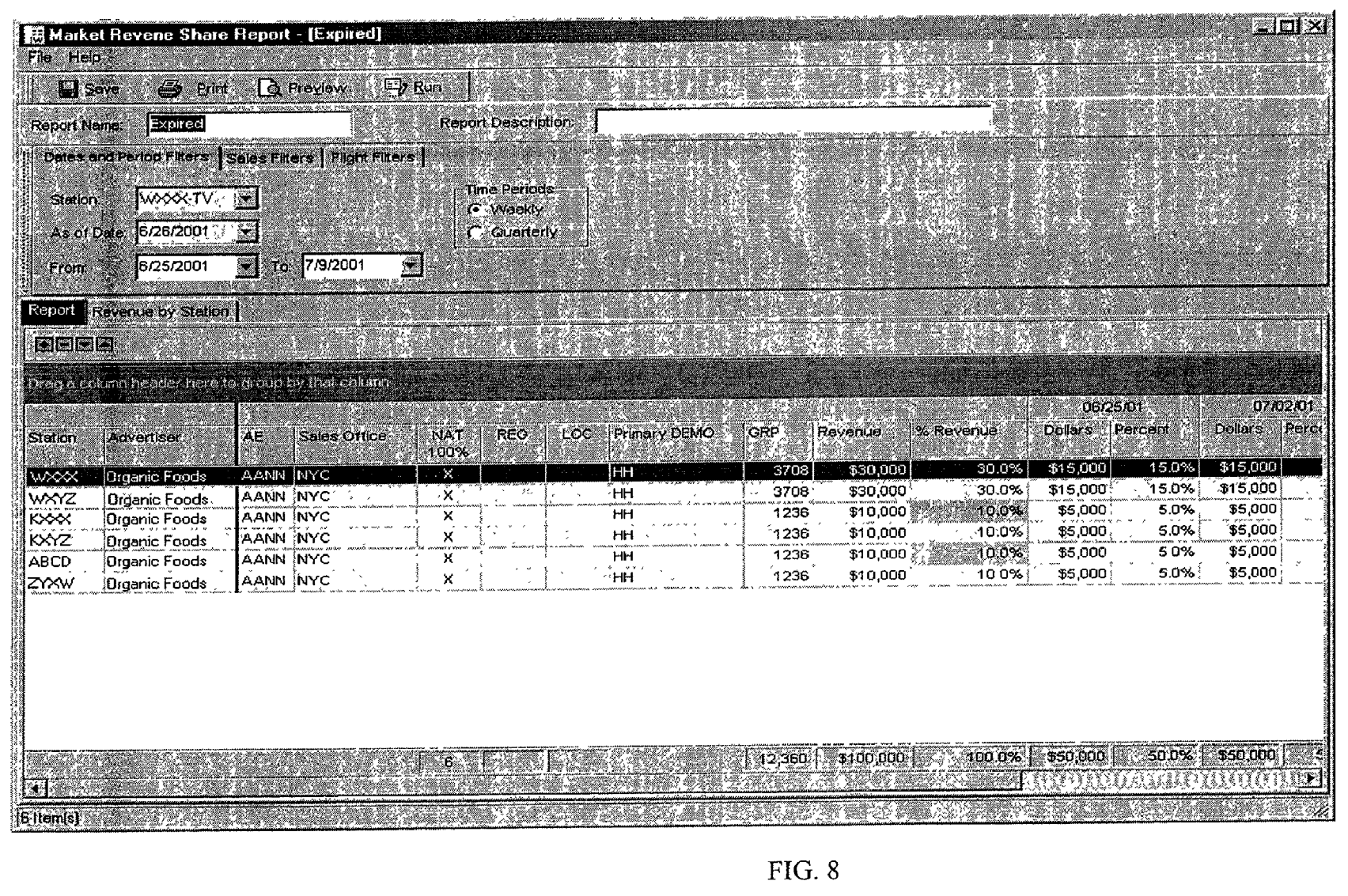

A Market Revenue Share report is presented in FIG. 8. It is similar to a Pending Avails report for a station's competitors, but it represents the reported share that each station received on an advertising buy. Using data from the Avail request form, this report aggregates collective reported % share by dayparts in a weekly or quarterly view based on the flight dates of the individual avail requests, and calculates the reported budget dollars for an advertiser on each station.

Figure 9:
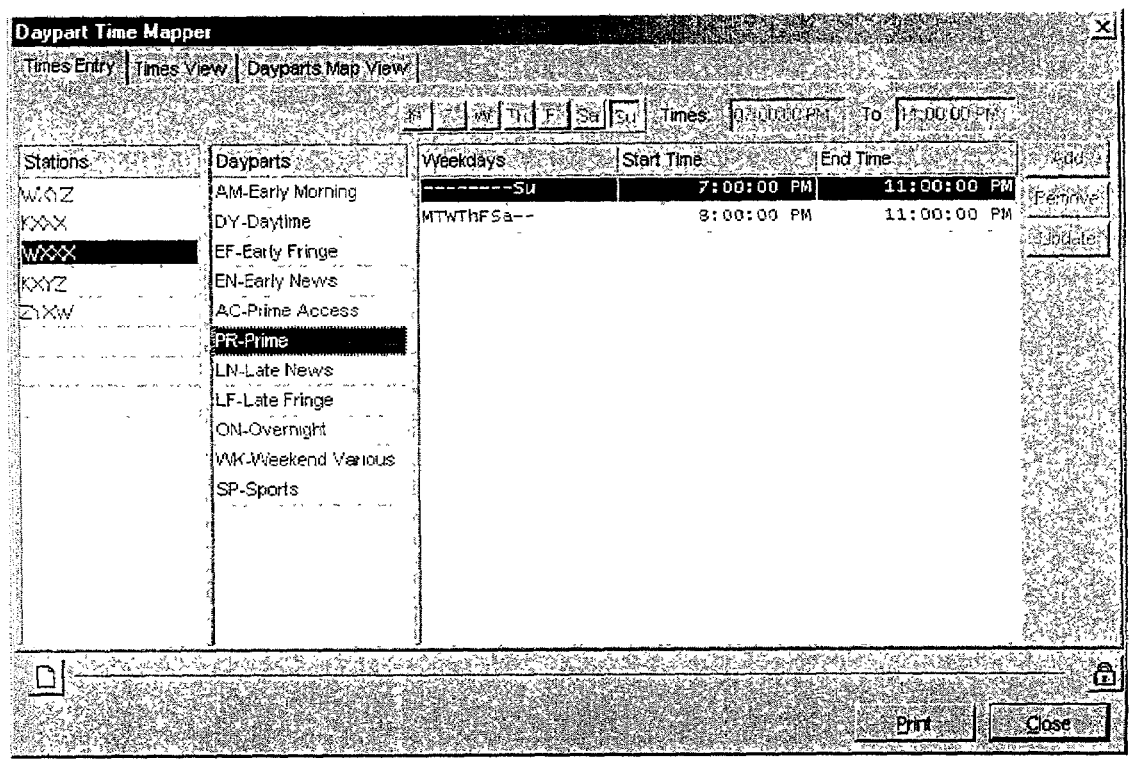
FIG. 9 is a daypart time mapping report.

In order to allow stations to customize their dayparts, a Daypart Time mapping report (see FIG. 9) is created to link the date and time from CMR with the day of the week and time (which defines a daypart) at the station. This map is set up upon installation of the system. The figure below displays the station, dayparts (set up at the station upon installation) and the Day of the Week, Weekday, Start Time and End Time of each daypart. Spots from CMR are mapped to a particular station-defined daypart through a background batch process. Since this process happens through code, there is no geographical user interface portion of this process in the system. The Daypart Time mapping report is utilized in creating the Market Blueprint Report of FIG. 10 as is next described.

A Market Blueprint report is depicted in FIG. 10. It measures the supply of rating points available in the market, which may be termed holding capacity. This report allows a user to create a blueprint of the market based on projected program avails and ratings. Blueprinting the Market is achieved by using monitor an advertiser service's data to determine the total number of avails by program and daypart for a market, and each station within the market. An example of an advertiser monitoring service is CMR (Competitive Media Reporting) for television and ABC (Audit Bureau of Circulations) for print. An example of a media rating service is Nielsen Media Research. This report also applies ratings data to avails, and determines the % contribution that each program represents to the market to provide a comprehensive station and market blueprint for a selected period of time. Specifically, CMR data lists the programs in the market, by station, date and time and the average rate for each program. Nielsen provides the rating for each program.

The Market Blueprint Report, as presented in FIG. 10, includes one report view tab for each station in the market. The "All" tab lists every program on every station. The columns are described below.

Station—imported from monitor service data, based on year/quarter selected. This is featured only on the "All" tab that displays the name of every station for which program data is provided.

Program—imported from monitor service data, based on year/quarter selected, it is an editable column that displays the program name.

Time Period—imported from monitor service data, based on year/quarter selected, it is an editable column that displays a description of the program's time period.

Weekdays—imported from monitor service data, based on year/quarter selected, it is an editable column that displays the day of the week of the program.

Daily Avails—imported from monitor service data, based on year/quarter selected, it is an editable column that displays the number of 30-second daily avails in the program.

Of Days—imported from monitor service data, based on year/quarter selected, it is an editable column that displays the number of days that the program airs over the course of a month.

Quarterly Avails—it calculates the number of quarterly 30-second avails available for this program, by the equation:

$$\text{Quarterly Avails} = (\text{Daily avails}) * (\text{\# Days in a quarter})$$

Demo PJ—imported from Nielsen, based on demographic selected, it is an editable column that displays the demographic rating (projected or actual (historical) rating) for each program.

Quarterly Points—it calculates the quarterly number of ratings points this program will generate by the equation:

$$\text{Quarterly Points} = (\text{Quarterly Avails}) * (\text{Demo PJ})$$

Est Sellout—input by the user, it displays the estimated sellout percentage for this program. Est CPP—imports and averages the CPP from monitor service data, it is an editable column that displays the estimated cost per point for this program.

Est Rate—it calculates the estimated rate for a 30-second spot in the program, by the equation:

$$\text{Estimated Rate} = \text{CPP} * (\text{Demo PJ})$$

Est. Revenue—it calculates the amount of revenue this program will generate per quarter at the estimated sellout at the estimated rate by the equation:

$$\text{Estimated Revenue} = (\text{Quarterly Points} * \text{CPP}) * (\%\text{Sellout}/100)$$

Percent Revenue—it calculates the percentage of the station's total revenue that this program contributes, by the equation:

$$\%\text{ Revenue} = \text{Estimated Revenue}/(\text{Sum of the Estimated Revenues})$$

As calculated in the Market Blueprint, % Revenue helps set the market CPP Tolerances, and guardrails for inventory pricing for the selected period of time.

Figure 11:
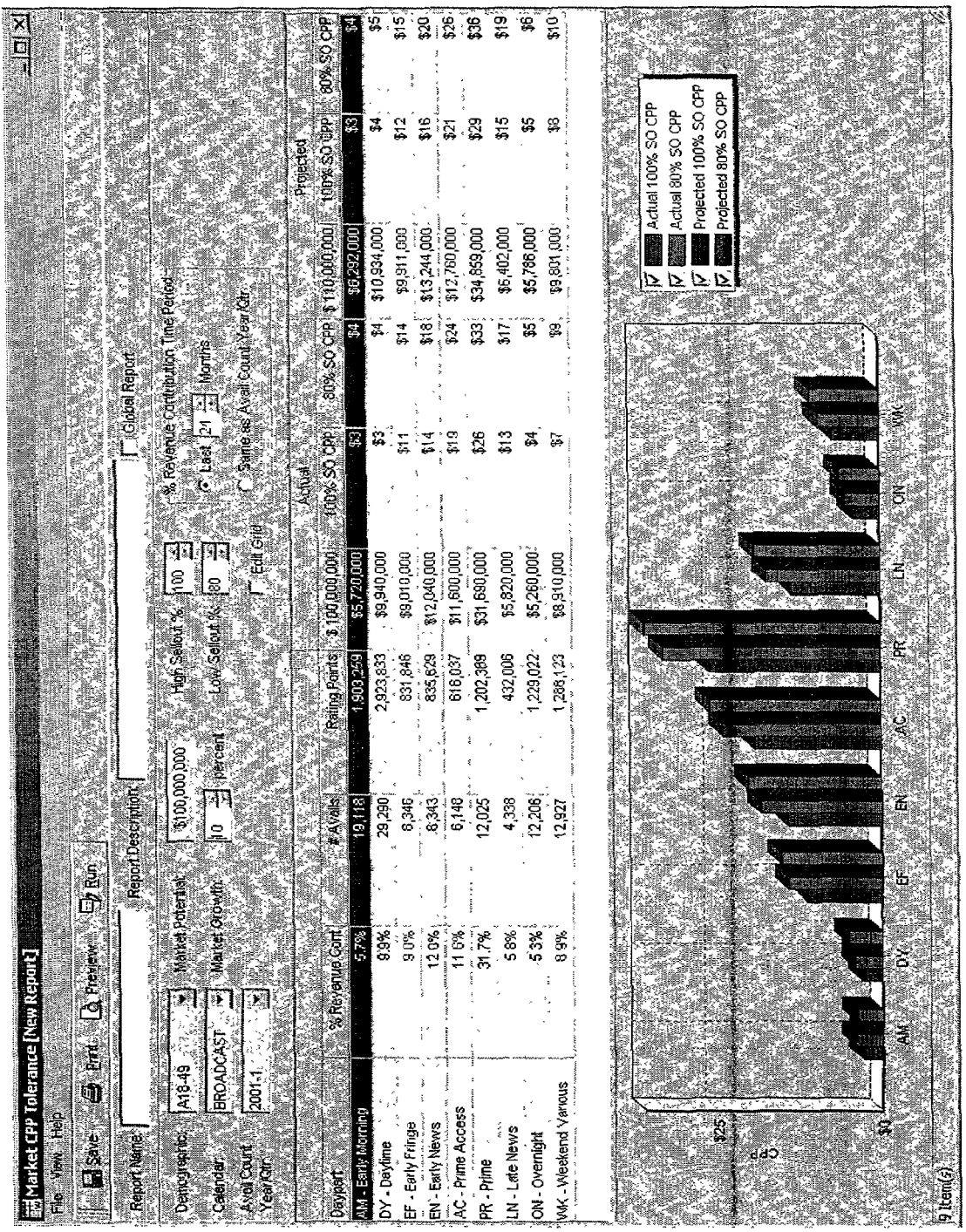
FIG. 11 is a market CPP tolerance report.

A Market CPP Tolerance report is depicted in FIG. 11; it uses monitor data, market audited figures and Neilsen ratings to provide actual and projected views of market CPP tolerance levels—the minimum and maximum CPP's the market will bear based on demand and available rating points. A user can use it as a report card to see how the user's station (or the competition) performed, or use it as a forecasting tool to help make better pricing decisions.

Based on market revenue and the selected demo and base year/quarter, the market CPP tolerances are calculated using daypart revenue divided by quarterly rating points. Using the high and low % sellout levels to set the marks, this report provides guidelines for pricing based on ratings points and demand. The fields above the report help define the report results. Before generating the report, a user inputs data or selects data from the drop down boxed provided in this area. The fields are defined as follows:

Demographic—the demographic selected determines the Nielsen rating point used in calculating numbers in the report.

Calendar—station defined upon installation. This field is not editable in this report.

Avail Count Year/Qtr—determines which CMR data to use when calculating numbers in the report.

Market Potential—input directly by the user. This number comes from actual audited market figures (for example, Ernst and Young).

Market Growth—defined by the user, displays the growth in the market represented by percentage. This is used to calculate Projected market values in the report.

High Sellout %—Maximum percentage at which the user estimates the sellout of station inventory.

Low Sellout %—Minimum percentage at which the user estimates the sellout of station inventory.

% Revenue Contribution Time Period—defines the sampling time period for revenue contribution.

The report results are provided in three areas. The first area displays the monitored data information by daypart (the Daypart, % Revenue Contribution, # Avails and Rating Points columns), while the other two areas compare the Actual cost per point tolerances (from the quarter and year selected) to the projected tolerances, based on the market growth percentage.

Daypart—displays the daypart for the station. This data is directly linked to CMR data with the Daypart Time Mapper depicted in FIG. 9 and described hereabove.

% Revenue Contribution—The percent contribution of total revenue is calculated by determining the total revenue per daypart (directly imported from CMR) and dividing that number by the total revenue during that time period (directly imported from CMR).

% Revenue Cont=(Revenue per daypart)/(total revenue during that time period)

Avails—displays the sum of the Avails per daypart, directly imported from CMR.

Rating Points—displays the total rating points for that daypart. The Nielsen rating point information is pulled into the system when the user selects the Demographic in the field above, and Rating Points are determined by using the equation:

Rating Points=(# Avails)*(Demographic rating from Nielsen)

Actual—The number at the top of the first column under Actual represents the total Actual Revenue Dollars. The numbers in that column are Actual Revenue Dollars by daypart. These numbers are calculated as follows:

---

Actual Revenue Dollars = (Market Potential * Revenue Contribution)/100
Example: $5,720,000 = (100,000,000 * 5.7)/100
High % SO CPP = (Actual Revenue for daypart)/
[(Rating Points) * (High Sellout/100)]

---

-continued

Example: $3 = $5,720,000/[1,903,259 * (100/100)]
Low % SO CPP = (Actual Revenue for daypart)/
[(Rating Points) * (Low Sellout/100)]
Example: $4 = $5,720,000/[1,903,259 * (80/100)]

---

Projected—The Projected section will vary based on the Market Growth percentage entered above. The number at the top of the first column under Projected represents the total Projected Revenue Dollars. The numbers in that column are Projected Revenue Dollars by daypart. The only difference in Projected vs. Actual is when calculating the Market Potential for Projected Revenue; it uses the following calculation for Market Potential:

---

Projected Market Potential =
(Market Potential) * [(Market Growth/100) + 1]
Example: 110,000,000 = 100,000,000 * [(10/100) + 1]

---

The numbers are calculated as follows:

---

Projected Revenue Dollars =
(Projected Market Potential * Revenue Contribution)/100
Example: $6,292,000 = (110,000,000 * 5.7)/100
High % SO CPP = (Projected Revenue for daypart)/
[(Rating Points) * (High Sellout/100)]
Example: $3 = $6,292,000/[1,903,259 * (100/100)]
Low % SO CPP = (Projected Revenue for daypart)/
[(Rating Points) * (Low Sellout/100)]
Example: $4 = $6,292,000/[1,903,259 * (80/100)]

---

A Pricing Grid Report is presented in FIG. 12. It gives a user a quick snapshot of revenue by program, based on variable scheduling and pricing scenarios. It can be used as a tool to monitor past performance, or project future revenue. The Pricing Grid can help the user make important programming decisions for a station, and analyze decisions made by the competition. The report provides a way to analyze program changes; adding a program, changing the number of avails in a program, or changing the % sell out of a program. The pricing grid (FIG. 12) is a stand-alone (does not import data from other areas in the system), editable grid. The X-axis supports $ amounts from a minimum to maximum value and the Y-axis supports a % sell-out value. The fields are defined as follows:

Of Units/Program—total number of 30-second avails in one program.

Of Programs/Week—number of times per week that this program will air.

Of Weeks—number of weeks per year that this program will air.

Minimum Rate—minimum rate expected to charge for this program. This number is estimation, entered by the user.

Maximum Rate—maximum rate expected to charge for this program. This number is estimation, entered by the user.

Rate Increment—rate increment displayed in the grid display ($10, for example). This is used to display the dollar-value separation between rows. The rate increment should be smaller for lower rates and larger for higher rates.

Lines to display—based on the above-entered data, this field will calculate how many display lines the Pricing Grid will generate.

Lines to display=(Max Rate—Min Rate)/Rate Increment

Projected Rating—projected average rating you expect this program to receive. The higher the rating, the lower the cost per point. This number represents the Nielsen rating number but is not input into the system directly from Nielsen. This field is estimated and populated by the user.

Total Units—based on the above-entered data, this field will calculate the total number of avails (units) available for this program per year.

Total Units=(# units per program)*(# programs per week)* (# weeks)

Rate—this column represents the row key and is determined by the maximum and minimum rates entered above and is spaced using the increment.

CPP—represents the CPP at the given rate, and is calculated by dividing the rate by the projected rating.

CPP=Rate/Projected Rating

Percentage Columns—for example, 100%, 90%, 80%, etc. is calculated as follows:

| | |
|---|---|
| 100%: | Revenue = Rate * (# of units) * (100/100) |
| 90%: | Revenue = Rate * (# of units) * (90/100) |
| 100%: | $215,000 = ($430 * 500) * 100/100 |
| 90%: | $189,000 = ($420 * 500) * 90/100 |

The grid is displayed with rates listed incrementally along the left side of the screen, along with associated CPP, and the amount of revenue that would be generated if the program was 100% sold out, 90%, 80%, etc., down to 10% sold out. The upper left portion of the grid displays the maximum revenue, given the constraints entered above, and the lower right portion of the grid displays your minimum revenue.

Figure 13:
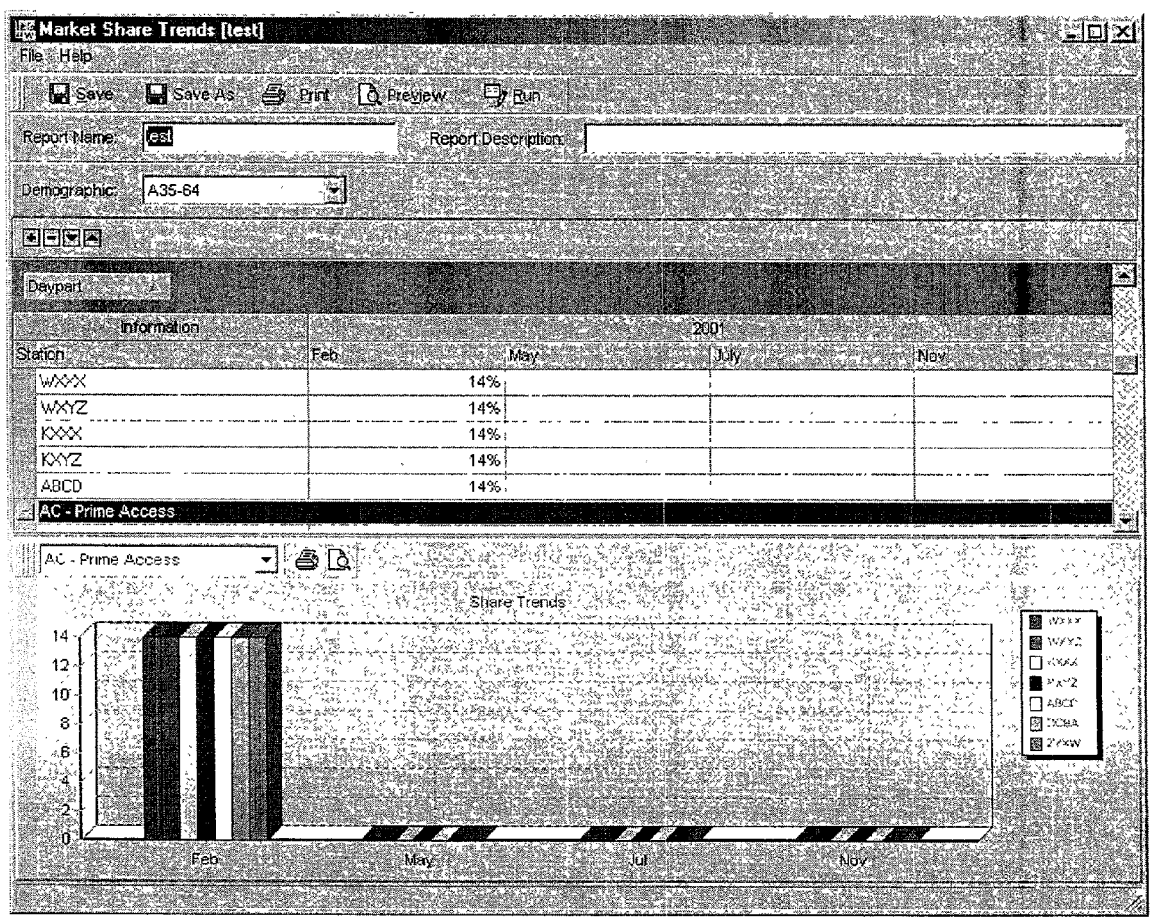
FIG. 13 is a market share trends report.

A Market Share Trends Report is presented in FIG. 13. It allows the user to see, by demo, what share of each daypart a station received. Share trends are also specific to the television industry. The trends are calculated by importing shares data from Nielsen (for each station), and reporting (by dayparts) how the shares data has trended over time. This is provided for every station in the market. Users can compare their stations' trend to other stations in the market. No revenue is indicated in the share trends. The % share trend columns are calculated and broken down by daypart, using the equation:

% Share=(sum of ratings for each station)/(sum of the rating for all stations)

While the invention has been shown and described with reference to certain preferred embodiments, it will be understood by those skilled in the art that various alterations in form and detail may be made therein without departing from the true spirit and scope of the invention. It is therefore intended that the following claims cover all such alterations and modifications in form and detail that nevertheless include the true spirit and scope of the invention.

I claim:

1. A method for creating a market cost per point (CPP) tolerance report for a selected time period, comprising the steps of:

selecting a plurality of programming dayparts that together comprise a broadcast day, and inputting an identifier of each said daypart into a computerized database;

selecting a demographic profile, and inputting said demographic profile into said computerized database in association with each said daypart;

obtaining a market potential dollar amount for the selected time period determining a percent revenue contribution for each said daypart by using the equation:

% Revenue Cont=(Revenue per daypart)/(total revenue during that time period), and storing said percent revenue contribution in said database in association with each said daypart; determining actual revenue dollars for each daypart by using the equation:

Actual Revenue Dollars=(Market Potential*Percent Revenue Contribution)/100, and storing said actual revenue dollars in said database in association with each said daypart; and obtaining a demographic rating for each said daypart, and inputting said demographic rating into said computerized database in association with each said daypart;

obtaining a total number of avails for each said daypart in said time period, and inputting said total number of avails into said database in association with each said daypart;

determining the total rating points for each daypart by using the equation:

Rating Points=(#Avails)*(Demographic rating), and storing said total rating points in said database in association with each said daypart;

determining a high sellout percentage figure, and inputting each said high sellout percentage figure into said database in association with each said daypart;

determining a low sellout percentage figure, and inputting each said low sellout percentage figure into said database in association with each said daypart;

determining a high % sellout CPP for each said daypart by using the equation:

High % SO CPP=(Actual Revenue for daypart)/[(Rating Points)*(High Setlout/100)], and storing said high percent SO CPP value in said database in association with each said daypart; and determining a low % sellout CPP for each said daypart by using the equation:

Low % SO CPP=(Actual Revenue for daypart)/[(Rating Points)*(Low Sellout/100)], and storing said low percent SO CPP in said database in association with each said daypart, and outputting a market CPP tolerance report in a user viewable media, wherein said market CPP tolerance report includes said percent revenue contribution for each said daypart and said actual revenue dollars for each said daypart, and wherein said market CPP tolerance report includes said rating points for each said daypart, said high % sellout CPP for each said daypart and said low % sellout CPP for each said daypart.

2. A method for creating a market cost per point (CPP) tolerance report for a selected time period, comprising the steps of:

selecting a plurality of programming dayparts that together comprise a broadcast day, and inputting an identifier of each said daypart into a computerized database;

selecting a demographic profile, and inputting said demographic profile into said computerized database in association with each said daypart;

obtaining a market potential dollar amount for the selected time period determining a percent revenue contribution for each said daypart by using the equation:

% Revenue Cont=(Revenue per daypart)/(total revenue during that time period), and storing said percent revenue contribution in said database in association with each said daypart;

determining actual revenue dollars for each daypart by using the equation:

Actual Revenue Dollars=(Market Potential*Percent Revenue Contribution)/100, and storing said actual revenue dollars in said database in association with each said daypart; and determining a projected market growth percent figure, and inputting said projected market growth percent figure into said database in association with each said daypart; and determining a projected market potential for each said daypart by using the equation:

Projected Market Potential=(Market Potential)* [(Market Growth/100)+], and storing said projected market potential in said database in association with each said daypart, outputting a market CPP tolerance report in a user viewable media, wherein said market CPP tolerance report includes said percent revenue contribution for each said daypart and said actual revenue dollars for each said daypart, and wherein said market CPP tolerance report includes said projected market potential for each said daypart.

3. A method for creating a market cost per point (CPP) tolerance report as described in claim 2 including the further steps of:

determining projected revenue dollars for each said daypart by using the equation:

Projected Revenue Dollars=(Projected Market Potential*% Revenue Contribution)/100), and storing said projected revenue dollars in said database in association with each said daypart, and wherein said market C-'PP tolerance report includes said projected revenue dollars for each said daypart.

4. A method for creating a market cost per point (CPP) tolerance report as described in claim 3 including the further steps of:

determining a projected high % sellout CPP for each daypart by using the equation:

Projected High % SO CPP=(Projected Revenue for daypart)/[(Rating Points)*(High Sellout/100)], and storing said projected high percent SO CPP in said database in association with each said daypart;

determining a projected low % sellout CPP for each daypart by using the equation:

Projected Low % SO CPP=(Projected Revenue for daypart)/[(Rating Points)*(Low Sellout/100)], and storing said projected tow percent SO CPP in said database in association with each said daypart, and wherein said market CPP tolerance report includes said projected high % sellout CPP for each said daypart, wherein said market CPP tolerance report includes said projected low % sellout CPP for each said daypart.

5. A computer readable storage medium including computer executable code for instructing a computer to perform a method for creating a market cost per point (CPP) tolerance report for a selected time period, comprising the steps of:

selecting a plurality of programming dayparts that together comprise a broadcast day, and inputting an identifier of each said daypart into a computerized database;

selecting a demographic profile, and inputting said demographic profile into said computerized database in association with each said daypart;

obtaining a market potential dollar amount for the selected time period determining a percent revenue contribution for each said daypart by using the equation:

% Revenue Cont=(Revenue per daypart)/(total revenue during that time period), and storing said percent revenue contribution in said database in association with each said daypart;

determining actual revenue dollars for each daypart by using the equation:

Actual Revenue Dollars=(Market Potential*Percent Revenue Contribution)/100, and storing said actual revenue dollars in said database in association with each said daypart; and obtaining a demographic rating for each said daypart, and inputting said demographic rating into said computerized database in association with each said daypart;

obtaining a total number of avails for each said daypart in said time period, and inputting said total number of avails into said database in association with each said daypart;

determining the total rating points for each daypart by using the equation:

Rating Points=(#Avails)*(Demographic rating), and storing said total rating points in said database in association with each said daypart;

determining a high sellout percentage figure, and inputting each said high sellout percentage figure into said database in association with each said daypart;

determining a low sellout percentage figure, and inputting each said low sellout percentage figure into said database in association with each said daypart;

determining a high % sellout CPP for each said daypart by using the equation:

High % SO CPP=(Actual Revenue for daypart)/ [(Rating Points)*(High Setlout/100)], and storing said high percent SO CPP value in said database in association with each said daypart; and determining a low % sellout CPP for each daypart by using the equation:

Low % SO CPP=(Actual Revenue for daypart)/ [(Rating Points)*(Low Sellout/100)], and storing said low percent SO CPP in said database in association with each said daypart, and outputting a market CPP tolerance report in a user viewable media, wherein said market CPP tolerance report includes said percent revenue contribution for each said daypart and said actual revenue dollars for each said daypart, and wherein said market CPP tolerance report includes said rating points for each said daypart, said high % sellout CPP for each said daypart and said low % sellout CPP for each said daypart.

6. A computer readable storage medium including computer executable code for instructing a computer to perform a method for creating a market cost per point (CPP) tolerance report for a selected time period, comprising the steps of:

selecting a plurality of programming dayparts that together comprise a broadcast day, and inputting an identifier of each said daypart into a computerized database;

selecting a demographic profile, and inputting said demographic profile into said computerized database in association with each said daypart;

obtaining a market potential dollar amount for the selected time period determining a percent revenue contribution for each said daypart by using the equation:

$$\text{\% Revenue Cont} = (\text{Revenue per daypart})/(\text{total revenue during that time period}),$$

and storing said percent revenue contribution in said database in association with each said daypart;

determining actual revenue dollars for each daypart by using the equation:

$$\text{Actual Revenue Dollars} = (\text{Market Potential} * \text{Percent Revenue Contribution})/100,$$

and storing said actual revenue dollars in said database in association with each said daypart; and determining a projected market growth percent figure, and inputting said projected market growth percent figure into said database in association with each said daypart; and determining a projected market potential for each said daypart by using the equation:

$$\text{Projected Market Potential} = (\text{Market Potential}) * [(\text{Market Growth}/100)+1],$$

and storing said projected market potential in said database in association with each said daypart, outputting a market CPP tolerance report in a user viewable media, wherein said market CPP tolerance report includes said percent revenue contribution for each said daypart and said actual revenue dollars for each said daypart, and wherein said market CPP tolerance report includes said projected market potential for each said daypart.

7. A computer readable storage medium including computer executable code for instructing a computer to perform a method for creating a market cost per point (CPP) tolerance report as described in claim 6 including the further steps of:

determining projected revenue dollars for each said daypart by using the equation:

$$\text{Projected Revenue Dollars} = (\text{Projected Market Potential} * \text{\% Revenue Contribution})/100,$$

and storing said projected revenue dollars in said database in association with each said daypart, and wherein said market C-'PP tolerance report includes said projected revenue dollars for each said daypart.

8. A computer readable storage medium including computer executable code for instructing a computer to perform a method for creating a market cost per point (CPP) tolerance report as described in claim 6 including the further steps of:

determining a projected high % sellout CPP for each daypart by using the equation:

$$\text{Projected High \% SO CPP} = (\text{Projected Revenue for daypart})/[(\text{Rating Points}) * (\text{High Sellout}/100)],$$

and storing said projected high percent SO CPP in said database in association with each said daypart;

determining a projected low % sellout CPP for each daypart by using the equation:

$$\text{Projected Low \% SO CPP} = (\text{Projected Revenue for daypart})/[(\text{Rating Points}) * (\text{Low Sellout}/100)],$$

and storing said projected tow percent SO CPP in said database in association with each said daypart, and wherein said market CPP tolerance report includes said projected high % sellout CPP for each said daypart, wherein said market CPP tolerance report includes said projected low % sellout CPP for each said daypart.

* * * * *